United States Patent [19]

Lywood

[11] Patent Number: 5,300,275
[45] Date of Patent: Apr. 5, 1994

[54] STEAM REFORMING

[75] Inventor: Warwick J. Lywood, Cleveland, England

[73] Assignee: Imperial Chemical Industries PLC, London, United Kingdom

[21] Appl. No.: 928,628

[22] Filed: Aug. 12, 1992

Related U.S. Application Data

[63] Continuation of Ser. No. 637,194, Jan. 3, 1991, abandoned.

[30] Foreign Application Priority Data

Jan. 8, 1990 [GB] United Kingdom ................. 9000389

[51] Int. Cl.$^5$ ............................................. C01B 3/12
[52] U.S. Cl. ................................ 423/655; 423/418.2; 423/652; 252/373
[58] Field of Search ................ 252/373; 423/652, 655, 423/659, DIG. 6, 418.2

[56] References Cited

U.S. PATENT DOCUMENTS

| | | | |
|---|---|---|---|
| 3,278,452 | 10/1966 | Vorum | 252/376 |
| 4,079,017 | 3/1978 | Crawford et al. | 422/187 X |
| 4,332,170 | 6/1982 | Fuderer | 252/373 |
| 4,479,925 | 10/1984 | Shires et al. | 423/359 |
| 4,690,690 | 9/1987 | Andrew et al. | 423/651 |
| 4,695,442 | 9/1987 | Pinto et al. | 423/359 |
| 4,750,986 | 6/1988 | Pinto | 208/64 |
| 4,824,658 | 4/1989 | Karafian et al. | 423/652 |
| 4,904,455 | 2/1990 | Karafian et al. | 422/201 |
| 4,919,844 | 4/1990 | Wang | 252/373 |
| 5,006,131 | 4/1991 | Karafian et al. | 422/201 |

FOREIGN PATENT DOCUMENTS

| | | |
|---|---|---|
| 0334540 | 9/1989 | European Pat. Off. |
| 51-158199 | 12/1976 | Japan. |
| WO87/00081 | 1/1987 | PCT Int'l Appl. |
| 991523 | 5/1965 | United Kingdom. |
| 2082623 | 3/1982 | United Kingdom. |
| 2160516 | 12/1985 | United Kingdom. |

*Primary Examiner*—Ferris Lander
*Attorney, Agent, or Firm*—Cushman, Darby & Cushman

[57] ABSTRACT

A process for the production of a hydrogen containing gas stream comprises partially reforming a feed stream containing hydrocarbon feedstock to be reformed together with a steam and/or carbon dioxide as reforming gas by passage of said feed stream over a steam reforming catalyst disposed in heated auxiliary tubes, thereby forming a partially reformed gas stream; subjecting the partially reformed gas stream, optionally together with a further quantity of said feedstock and/or reforming gas, to further reforming by passage over a steam reforming catalyst disposed in furnace reformer tubes heated by combustion of a fuel, thereby forming a reformed product gas stream; and passing the reformed product gas stream past the exterior of the auxiliary tubes, thereby supplying heat to said auxiliary tubes and cooling the reformed product gas stream.

9 Claims, 1 Drawing Sheet

STEAM REFORMING

This is a continuation of application Ser. No. 07/637,194, filed on Jan. 3, 1991, now abandoned.

This invention relates to steam reforming and in particular to the production of a gas stream containing hydrogen and carbon oxides, for example methanol synthesis gas, by steam reforming a hydrocarbon feedstock, such as natural gas or naphtha.

The steam reforming process is well known and involves passage of a mixture of the feedstock and steam over a steam reforming catalyst, e.g. nickel, and optionally cobalt, on a suitable support, for example rings of a ceramic such as alpha alumina or calcium aluminate cement. As the reforming reaction is strongly endothermic, heat has to be supplied to the reactant mixture, e.g. by heating the tubes in a furnace. The amount of reforming achieved depends on the temperature of the gas leaving the catalyst: generally an exit temperature in the range 700°–900° C. is employed. Heat can be recovered from the reformed gas leaving the tubes and from the furnace flue gas by heat exchange e.g. producing steam and/or preheating the reactants. However the amount of heat that can thus be recovered is often in an excess of requirements, and so recovered energy often has to be exported, e.g. as steam and/or electricity. As there is not necessarily a need for such exported energy, a more efficient process is often desired.

The amount of heat that need be recovered, for an efficient process, as steam and/or electricity can be reduced by using some of the heat in the reformed gas to supply heat required for reforming.

For example, as described in EP-A-0334540, by the provision of auxiliary reformer tubes heated by the reformed gas leaving the reformer tubes heated by a furnace (hereinafter referred to as the furnace reformer tubes), and the provision of a bypass so that part of the feedstock bypasses the furnace reformer tubes and is fed to the auxiliary reformer tubes, heat in the reformed gas stream from the furnace reformer tubes can be utilised to effect reforming of the portion of the feedstock that bypasses the furnace reformer tubes.

This procedure has the effect of reducing the temperature of the reformed gas stream, so that less heat need be recovered therefrom for efficient operation.

By using heat from the reformed gas produced in the furnace reformer tubes to effect heating of the auxiliary tubes, overall more reforming can be effected than if the auxiliary tubes were omitted and so, for a given heat input to the furnace reformer tubes, there is an increase in the amount of hydrogen-containing gas that is produced.

We have devised an advantageous modification of that process. In the aforesaid process, in order that the reformed gas leaving the auxiliary tubes has a relatively low methane content, it is necessary that the temperature of the reformed gas leaving the auxiliary tubes is relatively high: because of the need for adequate heat transfer from the reformed gas used to heat the auxiliary tubes and the gas undergoing reforming in the auxiliary tubes, this limits the extent to which the reformed gas used to heat the auxiliary tubes can be cooled and so the product reformed gas may still have a relatively high temperature, necessitating considerable further heat recovery therefrom for efficient operation.

In the present invention, instead of part of the feedstock bypassing the conventional fired reformer tubes and combining the reformed gas from the auxiliary tubes with the reformed gas from the conventional reformer after the latter has been used to heat the auxiliary tubes, the reformed gas produced in the tubes of the auxiliary reformer is used as part or all of the feed to the conventional fired reformer tubes. In this way the reformed gas from the auxiliary tubes is subjected to further reforming in the conventional reformer tubes and so the temperature of the reformed gas leaving the auxiliary tubes does not have to be so high. This enables the reformed gas used to heat the auxiliary tubes to be cooled by the heat exchange with the gas undergoing reforming in the auxiliary tubes to a greater extent, thereby giving a cooler product stream from which less heat has to be recovered for efficient operation.

Utilisation of heat from reformed gas to supply heat for effecting partial reforming of a feedstock before the latter is fed to externally heated reformer tubes is described in GB-A-2213496, but there the preliminary partial reforming was effected in one or more adiabatic catalyst beds and so the extent of the preliminary reforming that can be achieved is limited to that that can be achieved from the sensible heat imparted to the feedstock before the latter enters the adiabatic bed or beds.

Accordingly the present invention provides a process for the production of a hydrogen containing gas stream comprising:

a) partially reforming a feed stream containing hydrocarbon feedstock to be reformed together with at least one reforming gas selected from steam and carbon dioxide by passage of said feed stream over a steam reforming catalyst disposed in heated auxiliary tubes, thereby forming a partially reformed gas stream;

b) subjecting the partially reformed gas stream, optionally together with a further quantity of said feedstock and/or reforming gas, to further reforming by passage over a steam reforming catalyst disposed in furnace reformer tubes heated by combustion of a fuel, thereby forming a reformed product gas stream; and c) passing the reformed product gas stream past the exterior of the auxiliary tubes, thereby supplying heat to said auxiliary tubes and cooling the reformed product gas stream.

In a preferred form of the invention, which is of use for uprating an existing plant, the auxiliary tubes are provided in a separate vessel thus enabling, if desired, a conventional furnace reformer to be employed. Thus an existing plant employing a conventional furnace reformer can be uprated by the addition of an auxiliary reformer containing the auxiliary reformer tubes. Thus in this form of the invention the furnace reformer tubes are disposed within a first, furnace reformer, shell and the reformed product gas stream is passed out of the first shell and into a second, auxiliary reformer, shell in which the auxiliary reformer tubes are disposed, and past the exterior surface of which the reformed product gas stream passes.

In a preferred form of the invention, the auxiliary tubes are of the "double tube" configuration, i.e. where each tube comprises an outer tube having a closed end and an inner tube disposed concentrically within the outer tube and communicating with the annular space between the inner and outer tubes at the closed end of the outer tube, with the steam reforming catalyst disposed in said annular space. The feed stream is fed to the open ends of the annular catalyst-containing spaces between the inner and outer tubes while the reformed product gas stream is fed past the external surfaces of the outer tubes. The partially reformed gas stream leaves the annular spaces at the ends thereof adjacent the closed ends of the outer tubes and flows back through the inner tubes. One form of double-tube reformer is described in EP-A-124226. Another type of double tube reformer is described in EP-A-194067 wherein insulation is provided to minimise the amount of heat transferred through the walls of the inner tube from the partially reformed gas stream flowing through the inner tube. However in the present invention such insulation may be omitted so that heat transfer takes place through the wall of the inner tube from the partially reformed gas stream passing through the inner tube to the feed stream undergoing reforming in the catalyst-containing annular space of the auxiliary tubes. This heat transfer has a dual effect: firstly it supplies part of the heat required for the partial reforming of the feed stream and secondly it gives rise to cooling of the partially reformed stream. This is advantageous in the present invention as it gives a lower temperature inlet the furnace reformer enabling the use of lower grade material for the inlet pipework system to the furnace reformer.

The use of this type of reformer wherein a process gas stream, i.e. the reformed product gas stream, is used to heat the auxiliary reformer tubes has the advantage that the pressure differential across the auxiliary reformer tubes is relatively small, being merely that resulting from the pressure drop the process gas stream experiences as it passes through the furnace reformer tubes. This means that the auxiliary reformer tubes can be of thinner gauge material than is customary.

In the process of the invention the feedstock, i.e. hydrocarbon to be reformed, is preferably methane or natural gas containing a substantial proportion, e.g. over 90% v/v, methane. If the feedstock contains sulphur compounds, before, or preferably after, compression to the reforming pressure, which is conveniently in the range 5 to 40 bar abs., the feedstock is subjected to desulphurisation, e.g. by passage over a hydrodesulphurisation catalyst followed by absorption of hydrogen sulphide using a suitable absorbent, e.g. a zinc oxide bed. Usually it is desirable to incorporate a hydrogen-containing gas into the feedstock prior to hydrodesulphurisation: this may be achieved by recycling a small amount of the reformed gas, or a hydrogen-containing gas produced therefrom, e.g. a purge gas from a downstream operation e.g. methanol synthesis, to the feedstock prior to passage over the hydrodesulphurisation catalyst.

Prior to reforming, a reforming gas, e.g. steam, is mixed with the feedstock: steam introduction may be effected by direct injection of steam and/or by saturation of the feedstock by contact of the latter with a stream of heated water. The amount of steam introduced is preferably such as to give 2 to 4 moles of steam per gram atom of carbon in the feedstock. Some or all of the steam may be replaced by carbon dioxide where a supply thereof is available.

The feedstock/steam mixture is preferably preheated by heat exchange with, for example, the product reformed gas stream and/or the flue gases of the furnace reformer and then some or all thereof is fed as the feed stream to the auxiliary reformer tubes. While in some cases all the feedstock/steam mixture may be fed to the auxiliary tubes, it is preferred that part thereof bypasses the auxiliary tubes and is fed directly to the fired reformer tubes, preferably after preheating as aforesaid. It is preferred that 30 to 70% by volume of the hydrocarbon feedstock bypasses the auxiliary reformer tubes. The feed stream to the auxiliary reformer may be preheated separately, e.g. to a different temperature, to that bypassing the auxiliary reformer, and/or may contain a different proportion of steam and/or carbon dioxide from that bypassing the auxiliary reformer. For example steam may be introduced separately into the feedstock stream to be fed to the auxiliary reformer and to that bypassing the auxiliary reformer. In some cases, the feedstock fed to the auxiliary reformer may differ from that bypassing the auxiliary reformer.

The furnace reformer is preferably operated so that the temperature of the reformed product gas stream leaving the catalyst of the furnace reformer tubes in the range 750° to 950° C., especially 800° to 900° C. For a given feedstock/reforming gas composition, and reforming pressure, the methane content, and hence extent of reforming of the feedstock, will largely depend on the temperature of the reformed product gas leaving the furnace reformer tubes. It is preferred that the conditions are such that the methane content of the product reformed gas stream is in the range 2 to 10% by volume on a dry basis.

The proportion of feedstock that can be partially reformed in the auxiliary reformer tubes and the extent of that partial reforming will depend on the heat transfer characteristics between the product reformed gas used to heat the auxiliary reformer tubes and the gas undergoing partial reforming therein. In turn the heat transfer characteristics will determine the temperature to which the product reformed gas is cooled by that heat transfer. It is preferred that the amount of feedstock fed to the auxiliary tubes is such that the product reformed gas has a temperature in the range 450° to 650° C. after it has been used to heat the auxiliary tubes.

After reforming, the product reformed gas stream is cooled to below the dew-point of steam therein to condense unreacted steam as water, which is then separated. This cooling may be effected in conventional manner, e.g. by indirect heat exchange with reactants to be fed to the tubes of the fired reformer and/or auxiliary reformer, with water, giving hot water and/or steam (which may be used as process steam), and/or with steam giving super-heated steam from which power may be recovered in a turbine. Alternatively, or additionally, at least the final part of the cooling may be by direct heat exchange with water, giving a warm water stream, containing also the condensed water, which may be used, after further heating, as a hot water stream that is contacted with the feedstock to effect saturation thereof to introduce the process steam.

Depending on the intended use of the product reformed gas stream, the latter may be subjected to further process steps, e.g. the water gas shift reaction wherein carbon monoxide in the reformed gas stream is reacted with steam to produce hydrogen and carbon dioxide. The shift reaction is exothermic and heat may be recovered from the process gas, e.g. by heat exchange with water as aforesaid, before and/or after such a further process step.

BRIEF DESCRIPTION OF THE DRAWINGS

One form of the invention is illustrated by reference to the accompanying drawings in which

In FIG. 1 there is shown a furnace shell 1 containing a furnace reformer tube 2 in which a steam reforming catalyst 3, e.g. nickel supported on calcium aluminate cement rings, is disposed. Tube 2 is heated by combustion of a fuel within shell 1. Heat exchangers 4 and 5 are disposed in the flue gas duct 6 of the furnace shell 1. An auxiliary reformer shell 7 is provided and has disposed therein an auxiliary reformer tube of the "double tube" construction having the catalyst 8, e.g. also nickel supported on calcium aluminate cement rings, disposed in the annulus 9 between an outer tube 10 and an inner tube 11. Outer tube 10 is closed at its lower end, while the upper end of the outer tube 10 opens into a plenum chamber 12 in the upper end of shell 7. At the lower end of shell 7, a hot gas inlet 13 is disposed, connected to the outlet of the furnace reformer tube 2 of the furnace reformer. The shell 7 is also provided with a product reformed gas outlet 14 for the gas from the space outside the outer tube 10 and a partially reformed gas outlet 15 with which the inner tube 11 communicates. A feedstock/steam feed 16 leads to the heat exchanger 4 and a preheated reactants line 17 leads from heat exchanger 4 to the plenum chamber 12 of the auxiliary reformer reformer. A branch from heat exchanger 4 leads to heat exchanger 5 for further reactants preheating and a fired reformer furnace feed line 18 leads from heat exchanger 5 to connect with the partially reformed gas outlet line 15. The combined gas from feed line 18 and partially reformed gas outlet line 15 is fed to the fired reformer furnace tubes 2 via line 19. The reformed gas product line 14 leads to one or more heat exchangers 20 for effecting heat recovery.

Figure 1:
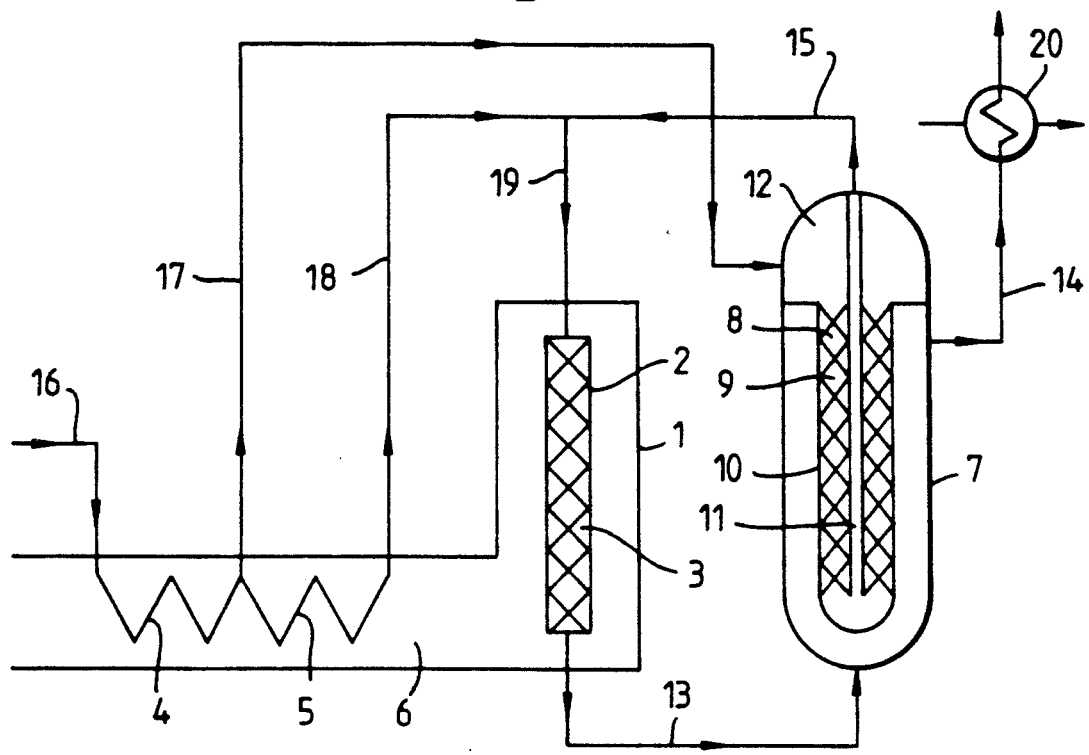
FIG. 1 is a diagrammatic flowsheet wherein for simplicity the reformers are shown with only single catalyst tube in each reformer: in practice there will of course generally be a multiplicity of tubes in each reformer.

In a typical operation a feedstock/steam mixture at an elevated pressure, typically in the range 5 to 40 bar abs. is preheated in heat exchanger 4 and part of the preheated reactants mixture is then fed to plenum chamber 12. The preheated reactants stream is fed, from plenum chamber 12, over the catalyst 8 in the annuli 9 between tubes 10 and 11 wherein it is partially reformed. The partially reformed stream leaves the lower end of the annuli and then passes up through the inner tubes 11 to outlet 15. The remainder of the preheated reactants stream from heat exchanger 4 is further heated in heat exchanger 5 and fed via line 18 and combined with the partially reformed gas from outlet line 15. The combined gas stream is then fed via line 19 to the furnace reformer tubes 2 wherein it passes over the catalyst 3 and is reformed by heat supplied by combustion of fuel within furnace shell 1 giving a reformed product stream which is then fed from tubes 2 out through furnace shell 1 and, via inlet 13, to the space within auxiliary reformer shell 7 outside the outer tubes 10, and then via outlet 14 to the heat exchanger 20. The heat required for the partial reforming of the feed to the auxiliary reformer is supplied from the reformed product stream passing past the outside of outer tubes 10 and from the partially reformed stream passing up through the inner tubes 11.

Heat is recovered from the product reformed gas stream in heat exchanger 20, for example by indirect heat exchange with water under pressure which is then used to effect introduce steam into the feedstock by direct contact to provide the mixture of feedstock and steam feed to line 16.

In a typical calculated example using a feedstock of desulphurised natural gas with a feed at a pressure of 29 bar abs., the gas composition, flow rates, and temperatures at various stages of the reforming operation are as shown in Table 1. The calculations assume that the catalyst in both the furnace reformer and the auxiliary reformer has the activity of standard commercial steam reforming catalysts of e.g. nickel supported on calcium aluminate cement rings.

TABLE 1

| Position | Temp (°C.) | Gas flow rate (kmol.h$^{-1}$) | | | | |
|---|---|---|---|---|---|---|
| | | $CH_4$ | $H_2$ | CO | $CO_2$ | $H_2O$ |
| 16 | 215 | 644.2$^a$ | 16.0 | 0.0 | 2.2 | 1932.4 |
| 17 | 400 | 322.1$^b$ | 8.0 | 0.0 | 1.1 | 966.2 |
| 11* | 760 | 138.8 | 646.0 | 81.6 | 102.8 | 681.2 |
| 15 | 620 | 138.8 | 646.0 | 81.6 | 102.8 | 681.2 |
| 18 | 540 | 322.1$^c$ | 8.0 | 0.0 | 1.1 | 966.2 |
| 19 | 581 | 460.9$^c$ | 654.0 | 81.6 | 103.9 | 1647.4 |
| 13 | 865 | 102.2 | 1805.2 | 351.7 | 192.5 | 1200.1 |
| 14 | 491 | 102.2 | 1805.2 | 351.7 | 192.5 | 1200.1 |

*Inlet, ie bottom.
$^{a,b,c}$the quoted figures include 50.6, 25.3, and 25.3 kmol.h$^{-1}$, respectively, of higher hydrocarbons expressed as $CH_{2.93}$ It is calculated that the heat load required in the fired reformer is 31.9 MW to effect the reforming in tubes 2 and 7.9 MW to effect the preheating in heat exchangers 4 and 5. The amount of heat transferred from the reformed product gas stream in the auxiliary reformer is 13.8 MW and 4.9 MW can be recovered (and used as part of the heat required for producing the steam incorporated into the feed 16) in heat exchanger 20 while cooling the reformed product gas to 350° C.

Figure 2:
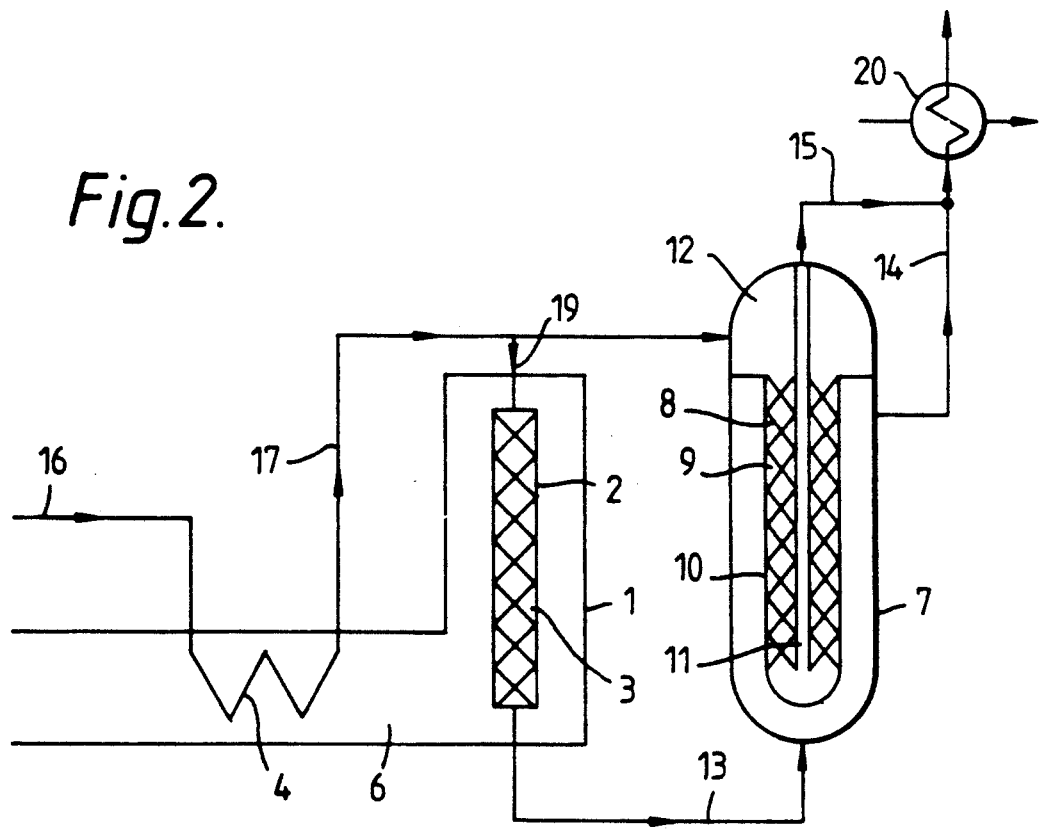
FIG. 2 illustrates the arrangement of EP-A-0334540 for purposes of comparison.

By way of comparison, in Table 2 there are shown the temperatures and gas compositions required to produce the same amount of product (hydrogen plus carbon monoxide) in a process of the type described in EP-A-0334540. In this case the flowsheet is shown in FIG. 2: heat exchanger 5 of the FIG. 1 embodiment is omitted, part of the preheated feedstock/steam mixture is fed from line 17 direct to plenum chamber 12 of the auxiliary reformer and the remainder is fed via line 19 to the reformer tubes 2, and, instead of the partially reformed gas from outlet 15 being fed to tubes 2, it is combined with the reformed gas leaving outlet 14 (so that the gas cooled in heat exchanger 20 is a mixture of the partially reformed gas from outlet 15 and the reformed product gas from outlet 14).

It is calculated that the heat load required in the fired reformer is 36.0 MW to effect the reforming in tubes 2 and 10.5 MW to effect the preheating in heat exchanger 4. The amount of heat transferred from the reformed product gas stream in the auxiliary reformer is 6.3 MW and 11.2 MW can be recovered (and used as part of the heat required for producing the steam incorporated into the feed 16) in heat exchanger 20 while cooling the reformed product gas to 350° C.

TABLE 2

| Position | Temp (°C.) | Gas flow rate (kmol.h$^{-1}$) | | | | |
|---|---|---|---|---|---|---|
| | | $CH_4$ | $H_2$ | CO | $CO_2$ | $H_2O$ |
| 16 | 215 | 665.4$^a$ | 16.5 | 0.0 | 2.3 | 1996.2 |
| 17 | 540 | 665.4$^a$ | 16.5 | 0.0 | 2.3 | 1996.2 |
| 12+ | 540 | 133.1$^b$ | 3.3 | 0.0 | 0.5 | 399.2 |
| 11* | 805 | 38.9 | 322.5 | 52.0 | 42.7 | 262.8 |
| 15 | 670 | 38.9 | 322.5 | 52.0 | 42.7 | 262.8 |
| 19 | 540 | 532.3$^c$ | 13.2 | 0.0 | 1.8 | 1597.0 |
| 13 | 865 | 84.4 | 1491.8 | 290.6 | 159.1 | 991.8 |
| 14 | 663 | 84.4 | 1491.8 | 290.6 | 159.1 | 991.8 |

TABLE 2-continued

| Position | Temp (°C.) | Gas flow rate (kmol.h$^{-1}$) | | | |
|---|---|---|---|---|---|
| | | CH$_4$ | H$_2$ | CO | CO$_2$ | H$_2$O |
| 14 + 15 | 664 | 123.3 | 1814.3 | 342.6 | 201.8 | 1254.6 |

*Inlet, ie bottom.
+Plenum chamber inlet
a,b,c the quoted figures include 52.3, 10.5 and 41.8 kmol.h$^{-1}$, respectively, of higher hydrocarbons expressed as CH$_{2.93}$

I claim:

1. A process for the production of a hydrogen containing gas stream consisting essentially of:
   a) passing a first feed stream containing hydrocarbon feedstock to be reformed together with at least one reforming gas selected from the group consisting of steam and carbon dioxide over a steam reforming catalyst disposed in heated auxiliary tubes, thereby forming a heated partially reformed gas stream;
   b) combusting a fuel in a furnace to heat furnace reformer tubes disposed therein and then passing the combustion products, after heating said furnace reformer tubes, to a flue gas duct;
   c) heating a second feed stream containing hydrocarbon feedstock to be reformed together with at least one reforming gas selected from the group consisting of steam and carbon dioxide by heat exchange with the flue gas in said flue gas duct, thereby forming a heated second feed stream;
   d) mixing all of said heated partially reformed gas stream with the heated second feed stream, thereby forming a heated furnace reformer feed mixture;
   e) subjecting the heated furnace reformer feed mixture to reforming in the furnace reformer, wherein the feed mixture is passed over a steam reforming catalyst disposed in said furnace reformer tubes, thereby forming a heated reformed product gas stream; and
   f) passing the reformed product gas stream from the furnace reformer tubes directly to and past the exterior of the auxiliary tubes, thereby supplying heat to said auxiliary tubes and cooling the reformed product gas stream.

2. A process according to claim 1 wherein a feed stream containing hydrocarbon feedstock to be reformed together with at least one reforming gas selected from steam and carbon dioxide is preheated by heat exchange with the flue gas and then divided to form said first feed stream which is fed to said auxiliary tubes and said second feed stream which is further heated by heat exchange with the flue gas before being mixed with the heated partially reformed gas.

3. A process according to claim 1 wherein the auxiliary tubes and the furnace reformer tubes are disposed in separate vessels.

4. A process according to claim 1 wherein each auxiliary tube comprises an outer tube having a closed end and an inner tube disposed concentrically within the outer tube and communicating with the annular space between the inner and outer tubes at the closed end of the outer tube, with the steam reforming catalyst disposed in said annular space, the feed stream is fed to the open ends of the annular catalyst-containing spaces between the inner and outer tubes while the reformed product gas stream is fed past the external surfaces of the outer tubes, and the partially reformed gas stream leaves the annular spaces at the ends thereof adjacent the closed ends of the outer tubes and flows back through the inner tubes.

5. A process according to claim 4 wherein the walls of the inner tube are free from insulation so that heat transfer takes place through the wall of the inner tube from the partially reformed gas stream passing through the inner tube to the feed stream undergoing reforming in the catalyst-containing annular space of the auxiliary tubes, whereby part of the heat required for the partial reforming of the feed stream is supplied from the heat in the partially reformed gas stream with the resultant cooling of the partially reformed gas stream.

6. A process according to claim 1 wherein 30 to 70% by volume of the hydrocarbon feedstock is fed directly to the furnace reformer tubes and the remainder fed to the auxiliary tubes.

7. A process according to claim 1 wherein the amount of feedstock fed to the auxiliary tubes is such that the product reformed gas has a temperature in the range 450° to 650° C. after it has been used to heat the auxiliary tubes.

8. A process according to claim 1 wherein the product reformed gas stream is cooled to below the dewpoint of steam therein to condense unreacted steam as water, which is then separated, and at least the final part of the cooling is by direct heat exchange with water, giving a warm water stream, containing also the condensed water, which is used, after further heating, as a hot water stream that is contacted with the feedstock to effect saturation thereof to introduce steam thereinto.

9. A process according to claim 8 wherein the product reformed gas is subjected to the water gas shift reaction before said direct heat exchange with water.

* * * * *